July 8, 1930.  N. WARSHAW  1,770,149

OILING SYSTEM FOR MOTORS

Filed May 3, 1926

Inventor.
Nathaniel Warshaw
by Heard Smith & Tennant.
Attys.

Patented July 8, 1930

1,770,149

UNITED STATES PATENT OFFICE

NATHANIEL WARSHAW, OF MATTAPAN, MASSACHUSETTS, ASSIGNOR OF TWENTY-FIVE PER CENT TO ARTHUR L. LEWIS, OF NEWTON CENTER, MASSACHUSETTS, AND TWENTY-FIVE PER CENT TO FREDERICK J. SHEPARD, JR., OF AUBURNDALE, MASSACHUSETTS

OILING SYSTEM FOR MOTORS

Application filed May 3, 1926. Serial No. 106,268.

This invention relates to improvements in lubricating systems for motors of the fluid expansion type and the principal object of the invention is to provide means for supplying a lubricant to the adjacent walls of the cylinder or chamber and the relatively movable power-transmitting motor.

More specifically the invention relates to improvements in mechanisms for temporarily lubricating the adjacent walls of the cylinder and piston of an internal combustion motor upon the starting of the motor.

After an internal combustion engine of the usual type has been stopped the hot lubricating oil drains down from the cylinders and pistons and the walls are washed clean by the unexploded charge entering the cylinder after the ignition is shut off. When the engine is next started raw gas in large quantities must be fed to the unoiled cylinders and a suitable time necessarily lapses before normal lubrication of the cylinder and piston is resumed. In cold weather this condition is extreme. In warm it is present to a lesser degree. If the engine is "balky" and does not start immediately the piston may "seize" for this reason. The lack of oil seal also often is the cause of the failure of an engine to start. The oil in the sump does not help as it is relatively viscous and takes a considerable time to flow, particularly in cold weather. In usual engines the scant wall lubrication between the pistons and cylinders is provided to avoid danger of "oil pumping" so that a proper lubrication of the piston and cylinder the wall is not obtained on the starting of the engine. As engines are started repeatedly under such condition much wear is caused which otherwise would not take place.

I am aware that means have been provided for pumping oil from the sump to the walls of the cylinder and piston during selective conditions of running of the engine, such means usually being controlled by the operation of the accelerator which controls the supply of hydrocarbon to the engine and in some instances it is assumed that the actuation of the accelerator upon the starting of the engine will cause the recirculation of oil from the sump to the adjacent walls of the cylinder and piston. In all such cases, however, of which I am aware the circulation of the supply of lubrication to the cylinder is dependent upon the power produced by the engine itself. The present invention contemplates the provision of means actuated by a source of power other than that of the engine temporarily to supply a relatively large amount of lubricant to the adjacent walls of the cylinder and piston immediately at the initiation of relative movement therebetween.

The invention in its broad sense contemplates supplying a lubricant to the adjacent walls of the power-transmitting member and the chamber in which fluid and expansion takes place in other types of motors, such as rotary motors and engines employing an expansible fluid other than that in which expansion is produced, as a result of explosion or slower combustion. More particularly the invention relates to means for forcing a supply of lubricant into the space between the adjacent walls of the cylinder and piston of an internal combustion motor by means actuated by the starter for the motor.

A further object of the invention is to provide means for supplying a lubricant to the adjacent walls of the cylinders and pistons of a multi-cylinder engine in which means are provided for maintaining a substantially continuous flow of lubricant at substantially the same pressure to all of the cylinders during the operation of the starter.

A further feature of the invention comprises means for distributing the lubricant more effectively in the space between the walls of the cylinder and the piston.

Other objects and features of the invention will more fully appear from the following description and the accompanying drawings and will be particularly pointed out in the claims.

Figure 1:
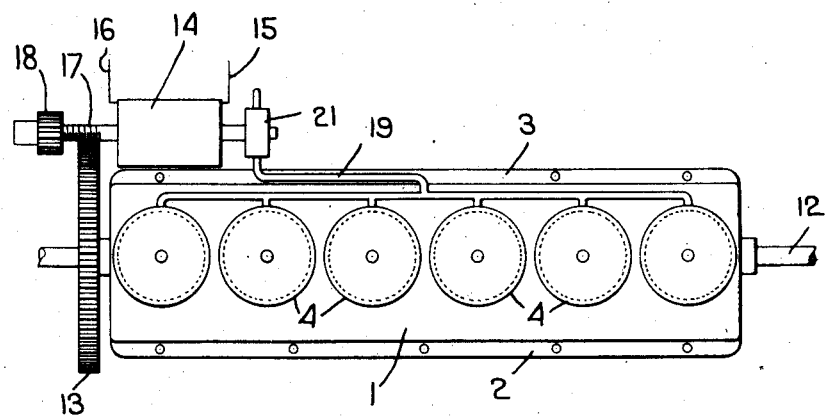
Fig. 1 is a plan view of a multi-cylinder internal combustion engine and the starter therefor showing the application of the present invention thereto.
Figure 2:
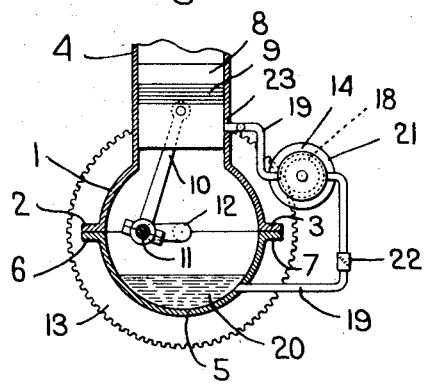
Fig. 2 is a vertical sectional view through one of the cylinders and crank case showing the conduit leading from the crank case through the cylinder wall with a rotary pump operable by the starter to supply lubricant within the cylinder wall upon the initiation of the starting of the motor.

The engine illustrated in the accompanying drawing may be and is of the usual type comprising a cylinder block and a crank case 1 having laterally extending flanges 2 and 3 by means of which it may be suitably supported and provided with a series of cylinders 4 (six in number as shown) which are preferably parts of the block 1. These cylinders are provided with the usual intake conduits and valves and exhaust conduits and valves with mechanism for actuating the same, all of which is common and well understood and need not be shown in the present drawing.

The lower half of the crank case 5 as illustrated is of semi-cylindrical form and is provided with flanges 6 and 7 which are secured respectively to the flanges 2 and 3 to the crank case portion of the cylinder block. Pistons 8 are reciprocably mounted in the respective cylinders and are provided with the usual expansible piston rings 9 which fit tightly within the cylinder. Each piston has pivotally connected to it a piston rod 10, the other end of the piston rod being connected to one of the cranks 11 upon the usual crank shaft 12 which extends longitudinally of the crank case and is mounted in suitable bearings therein. The gear 13 is secured to the crank shaft 12 and is adapted to be rotated in starting the engine by a suitable starter, such as a "Bendix" drive. Any type of starter may be employed. As illustrated herein the starter comprises an electric motor 14 which is supplied with electric current through suitable conductors 15 and 16. The usual rotor of the motor (which is not shown) is connected to the shaft 17 which is provided with a screw-threaded portion 17 upon which a pinion 18 is mounted. In the starting of the engine electric current is supplied to the starter of the motor which causes a rapid rotation of the motor shaft. Such rotation causes the gear 18 to travel along the screw-threaded portion of the shaft 17 until it engages the gear 13 on the crank shaft. Upon such engagement the pinion drives the gear 13 thereby turning over the motor thus causing reciprocation of the pistons within the cylinder. Each suction stroke of the piston serves to draw in a charge of explosive mixture and as the ignition is at this time turned on the explosion soon occurs which actuates the pistons and thereby rotates the crank shaft under the power transmitted by the expanding products of combustion.

As soon as the engine has started under its own power the supply of electricity to the starter is cut off and the gear 13 then begins to rotate the pinion 18 more rapidly than the shaft upon which it is mounted. This relative rotation between the pinion and its shaft causes the gear to be moved by the screw-threaded connection with the shaft lengthwise thereof and soon carries the pinion 18 out of engagement with the gear 13.

The means for supplying lubrication to the cylinder or cylinders of the motor illustrated herein comprises a conduit 19 which leads from the sump 20 within the crank case through the wall or walls of the cylinder within the field of reciprocation of the piston or respective pistons.

Suitable means are provided for forcing the lubricant through the conduit 19 immediately upon the starting of the motor. In the construction illustrated a rotary pump 21 is placed in the conduit 19, the pump 21 being actuated by the starter. In the particular construction shown the shaft 17 of the rotor of the electric motor is directly connected to the rotor of the pump and as the shaft 17 is rotated rapidly upon actuation of the starter a considerable flow of fluid is immediately initiated upon the energization of the starter motor. Thus a liberal amount of the lubrication is supplied to the space intermediate of the adjacent walls of the cylinders and pistons immediately upon actuation of the starter and this supply will continue so long as the starter remains in operation. Usually the starter continues in operation until the crank shaft has made several revolutions so that the amount of lubrication supplied to the walls of the cylinders and pistons is sufficient not only initially to lubricate these walls and to establish an oil seal but also to maintain ample lubrication until the usual oiling system of the motor regains its normal efficiency.

Desirably the conduit 19 is provided with a check valve 22 which will prevent the lubricant from flowing backwardly into the sump and will maintain the conduit full of oil so that upon the next energization of the starter oil will be immediately supplied to the adjacent walls of the cylinders and pistons.

While the conduit is shown herein as passing through the wall or walls of the cylinder or cylinders within the field of reciprocation of the piston it will be understood that the lubricant may be conducted to the cylinder wall in other places if so desired. Desirably the lubricant is conducted through the wall of the cylinder in such position that the port 23 through which the oil is discharged is not uncovered by the piston at either limit of movement of its reciprocation. Usually sufficient clearance is provided between the body or skirt of the piston and cylinder wall to permit a rapid distribution of lubrication therebetween while the piston rings closely fit the wall of the cylinder. However, this port may be located at points in which it will be uncovered by the piston during its upward or compression stroke so that the lubricant will be projected or sprayed upon the diametrically opposite, or lateral parts of the wall of the cylinder when the port uncovered by the piston.

If the port 23 is located at such a position that it is partially exposed upon the downward movement of the piston the check valve 22 will prevent the force of the expansion from driving the lubricant back into the sump.

Figure 3:
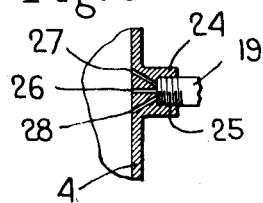
Fig. 3 is a detail sectional view through one of the walls of the cylinder showing a means for more widely distributing the lubricant along the space between the adjacent walls of the cylinder and piston.

If desired, means may be provided for more effectively distributing the lubricant in the space between the walls of the cylinder and piston or upon the wall of the cylinder if the port is uncovered. A convenient mechanism for accomplishing this purpose is illustrated in Fig. 3 in which the wall of the cylinder 4 is provided with a boss 24 having a countersunk screw-threaded portion 25 to receive the screw-threaded end of the conduit 19. A series of ports, such as a central port 26, and laterally extending ports 27 and 28, may be provided to communicate with the conduit 19 so that the lubricant which is forced through the conduit will be driven through the ports 26, 27 and 28 and as the ports 27 and 28 are oblique to the radius of the piston the lubricant forced therethrough will be ejected more nearly in the direction of the curvature of the walls of the cylinder or if the piston is raised sufficiently to uncover the ports 26, 27 and 28 the liquid will be projected against the portions of the wall of the cylinder opposite to the ports and also against lateral portions of said wall. In any event, the excess of liquid thus supplied to the walls of the cylinder and piston will be drained into the sump from which it will be recirculated.

By reason of the construction above described it will be obvious that when the starter is energized the lubricant will be supplied to the adjacent surfaces of the cylinder and piston immediately and as long as the starter is in operation. This avoids any danger of a "balky" engine seizing. An oil seal is established at once which aids in starting the engine with less priming and drag on the battery. After the starter is deenergized the momentum of its rotor will turn the oil pump many times before the pinion 18 is disengaged from the gear 13, thus an engine which has been idle for a long time may be readily started without danger of seizing and the wear of the cylinder and piston will be greatly reduced by the avoidance of lack of proper lubricant upon the starting of the engine.

In the preferred embodiment of the invention illustrated and described herein the crank case employed as the reservoir for the lubricant to be supplied to the walls of the piston and cylinders upon the starting of the motor but it will be understood that a separate reservoir may be employed if desired and the lubricant supplied for this purpose may be of a different quality or viscosity from that contained in the crank case.

It will be understood that the particular embodiment of the invention disclosed herein is of an illustrative character and that various changes in form, construction and arrangement of parts may be made within the spirit and scope of the following claims.

Having thus described the invention, what is claimed as new and desired to be secured by Letters Patent, is:

1. A motor comprising a chamber having relatively movable means therein operable by the expansion of gaseous fuel in said chamber to transmit power, a separate power-producing means associated with said motor, means for conducting a lubricant to the adjacent walls of said chamber and power-transmitting means, and means actuated by said separate power-producing means temporarily operable to force an ample supply of the lubricant to said conducting means immediately upon the starting of said separate power-transmitting means.

2. An internal combustion motor comprising a combustion chamber having relatively movable means therein operable by the expansion of gaseous products of combustion within said chamber to transmit power, means for conducting a lubricant to the adjacent walls of said chamber and power-transmitting means, a starter for said motor operable temporarily to actuate said motor, and means directly and immediately operable by said starter temporarily to force an ample supply of the lubricant through said conducting means.

3. An internal combustion motor comprising a cylinder, a piston reciprocable therein, a separate power-producing means associated with said motor, means for conducting a lubricant to the adjacent walls of the cylinder and piston, and means directly actuated by said separate power-producing means temporarily operable to force an ample supply of the lubricant through said conducting means upon initiation of relative movements between said piston and cylinder.

4. An internal combustion motor comprising a chamber, a piston reciprocable therein, means for supplying a lubricant to said cylinder to lubricate the adjacent walls of the cylinder and piston, a starter separate from said motor temporarily operable to actuate said piston, and means directly and immediately operable by said starter to cause said lubricant supplying means temporarily to deliver lubricant to said cylinder wall.

5. An internal combustion motor comprising a cylinder, a piston reciprocable therein, means for conducting a lubricant to the adjacent walls of said cylinder and piston within the field of reciprocation of said piston, and a starter temporarily operable to actuate said motor, and means directly and immediately operable by said starter temporarily to force the lubricant through said conducting means.

6. An internal combustion motor comprising a cylinder, a piston reciprocable therein, a crank operable by said piston, a crank case having a sump to contain oil to lubricate the crank bearings and the cylinder, a conduit leading from said sump to the inner wall of said cylinder within the field of reciprocation of the piston, a pump in said conduit, a starter temporarily operable to actuate the motor, and means directly and immediately operable by said starter for actuating said pump.

7. An internal combustion motor comprising a cylinder, a piston reciprocable therein, a crank operable by said piston, a crank case having a sump to contain oil to lubricate the crank bearings, and cylinder, a starter for said motor, a rotary pump having its rotor mounted upon the shaft of said starter, an intake conduit leading from said sump to said pump and a delivery conduit leading from said pump to the inner wall of the cylinder within the field of reciprocation of the piston.

8. An internal combustion motor comprising a plurality of cylinders, pistons for the respective cylinders, a crank operable by said pistons, a crank case having a sump containing oil to lubricate the crank bearings and cylinder walls, a starter for said motor, a rotary pump having its rotor mounted upon the shaft of said starter, an intake conduit leading from said sump to said pump and a delivery conduit from said pump having a manifold leading to the inner walls of the respective cylinders within the field of reciprocation of said pistons.

9. An internal combustion motor comprising a cylinder and a piston reciprocable therein means for conducting lubricant through the wall of said cylinder within the field of reciprocation of the piston and having means to distribute the lubricant along the adjacent walls of the cylinder and piston, a starter temporarily operable to actuate the motor, and means operable by said starter temporarily to force the lubricant to said conducting means.

10. An internal combustion motor comprising a cylinder, a piston reciprocable therein, a crank operable by said piston, a crank case having a sump to contain oil to lubricate the crank bearings and cylinder, a starter temporarily operable to actuate said motor, a rotary pump having its rotor mounted upon the shaft of said starter, an intake conduit leading from said sump to said pump, a check valve in said intake pump acting to prevent the flow of oil from said pump back into the sump and a delivery conduit leading from said pump to the inner wall of the cylinder within the field of reciprocation of the piston.

11. An internal combustion motor comprising a cylinder, a piston reciprocable therein, means for conducting a lubricant to the adjacent walls of said cylinder and piston within the field of reciprocation of said piston, an electrically operable starter normally inactive during the operation of the motor, means temporarily operable by said starter to initiate the action of said motor, a rotary pump operable by said starter to force a lubricant through said conducting means to the adjacent walls of said cylinder and piston and operable only thus to supply lubricant during the starting of the motor.

12. An internal combustion motor comprising a cylinder, a piston reciprocable therein, means for conducting a lubricant to the adjacent walls of said cylinder and piston within the field of reciprocation of said piston, an electrically operable starter normally inactive during the operation of the motor, means temporarily operable by said starter to initiate the action of said motor, a rotary pump having its rotor mounted upon the shaft of said starter operable to force a lubricant through said conducting means to the adjacent walls of said cylinder and piston and operable only thus to suppy lubricant during the starting of the motor.

13. A motor comprising a chamber having a movable piston therein and operated by the expansion of gases in said chamber to transmit power, a separate power producing means to start the same, and means actuated by said separate power producing means only to supply lubricant to the walls of said chamber on starting.

In testimony whereof, I have signed my name to this specification.

NATHANIEL WARSHAW.